United States Patent
Sale et al.

[11] Patent Number: 6,132,608
[45] Date of Patent: Oct. 17, 2000

[54] OPTIMIZED WAX FOR SEALING THE EDGE OF A FILTER SHEET

[75] Inventors: Richard D. Sale, Tolland; Mark W. Schimmel, Stafford Springs, both of Conn.; Richard A. Prince, Westfield, Mass.; Norbert Roessler, Guilford, Conn.

[73] Assignee: Cuno Incorporated, Meriden, Conn.

[21] Appl. No.: 09/162,583

[22] Filed: Sep. 29, 1998

Related U.S. Application Data

[60] Provisional application No. 60/061,124, Oct. 6, 1997.

[51] Int. Cl.[7] .................. B01D 25/127; B01D 25/164
[52] U.S. Cl. ................. 210/228; 210/227; 210/507; 210/508; 210/495; 210/450; 55/502; 55/511; 428/192; 428/484
[58] Field of Search ................... 210/224, 227, 210/228, 229, 483, 495, 499, 496, 507, 508, 445, 450; 277/918; 55/502, 511; 428/192, 210, 211, 484, 486

[56] References Cited

U.S. PATENT DOCUMENTS

| | | |
|---|---|---|
| 2,601,598 | 6/1952 | Daniel, Jr. et al. . |
| 2,854,351 | 9/1958 | Wilson . |
| 3,250,398 | 5/1966 | Adiletta . |
| 3,933,714 | 1/1976 | Adams .................. 524/228 |
| 4,072,789 | 2/1978 | Hammersmith . |
| 4,212,746 | 7/1980 | Tholema et al. . |
| 4,439,473 | 3/1984 | Lippman . |
| 4,551,306 | 11/1985 | Bouwman et al. ........... 522/56 |
| 4,582,869 | 4/1986 | Waggoner ................ 524/227 |
| 4,931,178 | 6/1990 | Manniso et al. . |
| 5,593,580 | 1/1997 | Kopf . |
| 5,665,235 | 9/1997 | Gildersleeve et al. . |
| 5,700,373 | 12/1997 | Ritland et al. . |
| 5,709,794 | 1/1998 | Emmons et al. . |
| 5,763,973 | 6/1998 | Cramer . |

FOREIGN PATENT DOCUMENTS

| | | |
|---|---|---|
| 56-5110 | 1/1981 | Japan . |
| 7-96105 | 4/1995 | Japan . |
| 7-328359 | 12/1995 | Japan . |
| 827362 | 2/1960 | United Kingdom . |
| 2266672 | 11/1993 | United Kingdom . |

*Primary Examiner*—W. L. Walker
*Assistant Examiner*—Terry K. Cecil
*Attorney, Agent, or Firm*—Steven J. Moore; Cummings & Lockwood

[57] ABSTRACT

A filter sheet positioned between plates (14) of a filter press has a fluid-impermeable wax layer (11) sealing the sheet's perimeter. The wax preferably comprises ethylene bis stearamide and has a durometer reading of about 75 to about 100 Shore A hardness at 25° C. and 85° C., a melt point of about 110° C. to about 180° C., and a viscosity of less than about 100 cp at 155° C. The wax layer increases the useful life of the filter sheet while providing a sheet which is easily released from a filter press and which retains integrity along the seal during repeated hot water sanitations.

25 Claims, 2 Drawing Sheets

OPTIMIZED WAX FOR SEALING THE EDGE OF A FILTER SHEET

This application claims benefit to U.S. Provisional Application No. 60/061,124, filed Oct. 06, 1997.

BACKGROUND OF THE INVENTION

1. Field of the Invention

The present invention generally relates to an improved filter sheet having its edges sealed with wax. More particularly the present invention relates to a filter sheet sealed along its edges with a non-microcrystalline wax. More specifically, an embodiment of the present invention relates to a filter sheet sealed along its edges with a wax having a durometer reading of about 75 to about 100 Shore A hardness at about 25° C. and about 85° C., a melt point of about 110° C. to about 180° C., and a viscosity of less than about 100 cP at about 155° C. Further, an embodiment of the present invention relates to a filter sheet sealed along its edges with a wax comprising ethylene bis stearamide. Sealing of the edges of a conventional filter sheet with such waxes, and in particular a wax comprising ethylene bis stearamide, significantly increases the useful life of the filter sheet while providing a sheet which is easily released from a filter press and which retains integrity along the seal during repeated hot water sanitizations.

2. Background of the Related Art

Filtration is the process of separating particles from a fluid suspension (liquid or gas) by use of a porous medium or by means of a medium possessing chemical properties, such as hydrophobicity, electrostatic charge, etc., which permit such medium to interact and hold the particles which are to be separated from the fluid while permitting the fluid to pass there through. In conventional filtration, the filter medium retains most of the suspended particles which are filtered on or within itself, but allows the fluid being filtered to pass through unimpeded. Flow across the filter medium is generally achieved by the application of a driving force, usually in the form of a static pressure difference across the filter, which may be generated, for example by external pressure applied upstream, a vacuum applied downstream, gravity, or centrifugal force. Fluid suspension separations are used extensively in the manufacture of polymer products, medicinals, mineral and metallurgical processing, petroleum refining, water purification, emissions control, and in beverage and food preparation.

Most conventional filters may be categorized into two broad categories of filters: surface-type or cake filters, and depth-type filters. In surface-type filters solids form a filter cake on the surface of the filter medium, the cake itself forming a filter which clogs with time. Particles larger than the pore size of the filter medium are stopped at the upstream surface of the filter. In depth filtration, on the other hand, the filters are constructed of medium of sufficient thickness to filter along its bulk. Typically the filter medium has pore sizes much greater than the particles to be removed, so that the particles can penetrate into the medium. The particles are retained in the medium by means of random path low-efficiency particle captures and by adsorptive surface forces (molecular and electrostatic).

A well-known, and widely employed filter assembly, which may be described as a combination of a surface-type and depth-type filter, is the filter press. The basic filter press consists of either a series of recessed plates, or an alternating combination of plates, and cake-holding frames, a structure to support these elements, and a system for closing the elements together with enough force on the sealing faces to counterbalance the forces generated during filtration. Each plate is covered with a filter medium which acts as the filtration surface. Each plate and frame typically utilizes a unitary liquid feed conduit provided with openings at spaced intervals along its length and extending thorough the stacked plates as a means to introduce influent fluid into the flow channels defined between adjacent plates in the stacked plate assembly and through the filter medium and out an exit port within each plate. Typically, a unitary liquid withdrawal conduit featuring openings at spaced intervals along its length correspondingly extends through the staked plates and conveys the filtered fluid out of the filter press. As filtrate passes through the filter medium, a cake of solids is built up in the spaces between the plates on the filter medium on the "feed liquid sides" (i.e., activate filtration surfaces of the filter sheets). Conventionally, once the filter press is filled with solid filter cake material, the filter medium is either backwashed or filtration is stopped and the cake is washed from the press, or the press is opened, the plates separated and the solid filter cake removed. If filtration is stopped, the filter medium can be removed for washing or replacement and the system drained of liquid. Automation of the press may include opening and closing the press and shifting the plates in a manner to dump the cakes. Conventional filter presses commonly operate at pressures up to 100 lb./sq. in., and with special construction, metal presses may be operated up to 1000 lb/sq. in. The filter press has a number of advantages, including but not limited to,. simplicity, relatively low cost, flexibility and the ability to operate at high pressures as either a surface-type filter or a clarifying filter.

Filter media used on filter presses are referred to as filter sheets which include filter cloths and filter felts. The construct of such filter sheets optimally provides minimum flow resistance, offers resistance to blinding and ease of sanitation, and proffers strength and durability. Permeability and porosity are prime qualities to be considered in material selection and manufacture of the filter sheet. Filter sheets are frequently spun from monofil, multifil and/or staple fibers and filter felts, such as, for example, polyesters, viscose, polypropylene-polyamide, polyacrylonitrile, cotton, coconut fiber, sisal, hemp or any mixture of the preceding.

In order to permit easy replacement of spent filter sheets, filter sheets are conventionally held by physical means between the plates of a filter press rather than being integral and non-detachable therewith. A major problem with such detachable engagement between the plates is that any portion of the filter sheet perimeter extending over the plate tends to wick, by capillary action, filtrate from the filtration surface of the filter sheet to the outermost perimeter of another plate. The wicked fluid further often causes the filter sheet to stick to the plate at the point of its interface with the plate interfering with smooth opening of the press. Sticking, especially between plate surfaces designed to interface or articulate with adjoining plate surfaces, may further decrease the durability of multiple-use filter sheets.

To overcome the wicking problem filter sheets are known wherein the edges are coated with a latex material, such as polychloroprene. As noted in U.S. Pat. No. 4,212,746, the problem with latex materials, such as polychloroprene, is that, frequently, they do not sufficiently prevent capillary action of the fabric and exacerbate sticking between the plate and the edge-sealed filter sheet. This U.S. patent describes a filter sheet edge seal having one or more layers of a polychloroprene latex mixture containing zinc oxide and a silicate filler and a polychloroprene with carboxyl groups, which is said to greatly reduce sticking, thereby increasing durability. However, the manufacture of even the edge seals described in U.S. Pat. No. 4,212,746 pose problems.

For example, such latex seal must be appropriately cured prior to application of the filter sheet to the pressure plate. As liquid-tight latex seals frequently require application of multiple layers, multiple curing steps are frequently needed, involving considerable lost production time and capital expense. U.S. Pat. No. 4,212,746 discloses that it is particularly advantageous to dip the filter sheet into another chloroprene latex mixture of higher viscosity after the sheet has dried, the twice immersed filter sheets being said to be completely liquid-tight and gas-tight. Further, such seals, relying on multi-component compositions, suffer from the inherent increased danger of leaching of one or more of its components into the filtrate and/or reaction of the seal components with solubilized materials in the filtrate.

The employment of filter sheets in the filtration of suspensions containing organic materials has been particularly problematic. The life of such filters tends to be determined by microbial growth through the filter sheets rather than the durability of the sheet, or contaminant plugging. When such microbial infiltration into the filter sheet occurs, filtration must be suspended in order to avoid contamination of the product. Hot fluid sanitizing flushes of the filters are typically used to aid in reducing the growth of microbes. The use of anti-microbial agents on the filter sheet is typically not a practicable solution as often the product being filtered is a food stuff wherein consumption is predicated on exacting purity considerations.

There is a need, therefore, for better filter sheet edge seals which do not require intermediate curing in the manufacture process, which do not require multi-component compositions which increase the risk of contaminate leachate from the seal and reaction of the seal components with solubilized materials in the filtrate, and the composition of which simplify the production of edge sealed filter sheet.

SUMMARY OF THE INVENTION

An object of the present invention is to provide a filter sheet for use in a filter press which is sealed along its edges in such a manner that the filter sheet edge is fluid-tight.

Another object of the present invention is to provide a fluid-tight edge sealed filter sheet for use in a filter press that resists sticking between the edge seal and any component of the filter press to which it comes into contact.

Another object of the present invention is to provide for a fluid-tight edge sealed filter sheet for use in a filter press which decreases the rate of microbial infiltration into the filter sheet as compared to non-edge sealed filter sheets.

Another object of the present invention is to provide a fluid-tight edge sealed filter sheet which does not require prolonged periods of cure time for the seal to set.

And yet a further object of the present invention is to provide a method for manufacturing a fluid-tight edge sealed filter sheet using waxes.

In accordance with these and further objects, one aspect of the present invention includes a filter sheet for use in a filter press having a fluid impermeable wax layer coursing about its perimeter, the wax of such impermeable wax layer having a durometer reading of about 75 to about 100 Shore A hardness at about 25° C. and about 85° C., a melt point of about 110° C. to about 180° C. and a viscosity of less than about 100 cP at about 155° C.

Another aspect of the present invention includes a filter sheet for use in a filter press having a fluid impermeable wax layer coursing about its perimeter, the wax of such wax layer having a durometer reading of about 80 to about 90 Shore A hardness at about 25° C. and about 85° C., a melt point of about 130° C. to about 160° C. and a viscosity of less than about 20 cP at 155° C.

Still another aspect of the present invention is a filter sheet having a sealing means disposed around the periphery of the filter sheet and surrounding an unsealed portion of the filter sheet wherein the sealing means comprises, a wax layer wherein the wax of such wax layer has a durometer reading of about 75 to about 100 Shore A hardness at 25° C. and 85° C., more preferably about 85 to about 95 Shore A hardness, a melt point of about 110° C. to about 180° C., more preferably of about 130° C. to about 160° C., and a viscosity of less than about 100 cP at about 155° C.

Yet another aspect of the present invention includes a filter sheet having a fluid impermeable wax layer coursing about an enclosed area of the filter sheet which is permeable to the fluid to be filtered, wherein the wax of such fluid impermeable wax layer has a durometer reading of about 75 to about 100 Shore A hardness at 25° C. and 85° C., more preferably of about 80 to about 90 Shore A hardness, has a melt point of about 110° C. to about 180° C., more preferably of about 130° C. to about 160° C. and a viscosity of less than about 100 cP at about 155° C.

Still another aspect of the present invention includes a filter sheet having a fluid impermeable ethylene bis stearamide wax layer coursing about an enclosed area of the filter sheet, such enclosed area being permeable to the fluid to be filtered.

Another aspect of the present invention is a method for sealing a portion of a filter sheet comprising the steps of: a) melting a wax having a durometer reading of about 75 to about 100 Shore A hardness at about 25° C. and about 85° C., a melt point of about 110° C. to about 180° C., and a viscosity of less than about 100 cP at about 155° C.; b) applying the melted wax to the filter sheet such as to enclose said portion of the filter sheet, thereby forming a treated filter sheet; c) exposing the treated filter sheet to a temperature of about 140–160° C., for about 2 minutes to about 25 minutes such that the wax permeates through the filter sheet; d) cooling the filter sheet to a temperature sufficient to congeal the wax.

And yet another aspect of the present invention is a method for sealing a portion of a filter sheet comprising the steps of: a) melting a wax comprising ethylene bis stearamide; b) applying said melted wax comprising ethylene bis stearamide to the filter sheet such as to enclose the portion of said filter sheet, thereby forming a treated filter sheet; c) exposing the treated filter sheet to a temperature of about 148–152° C. for a period of time of about 10 seconds to about 40 seconds such that the wax permeates through the filter sheet; d) cooling the filter sheet to a temperature such that such wax congeals.

Other objects and advantages of the invention will be apparent from the following description, the accompanying drawings and the appended claims.

DETAILED DESCRIPTION OF THE INVENTION

Figure 1:
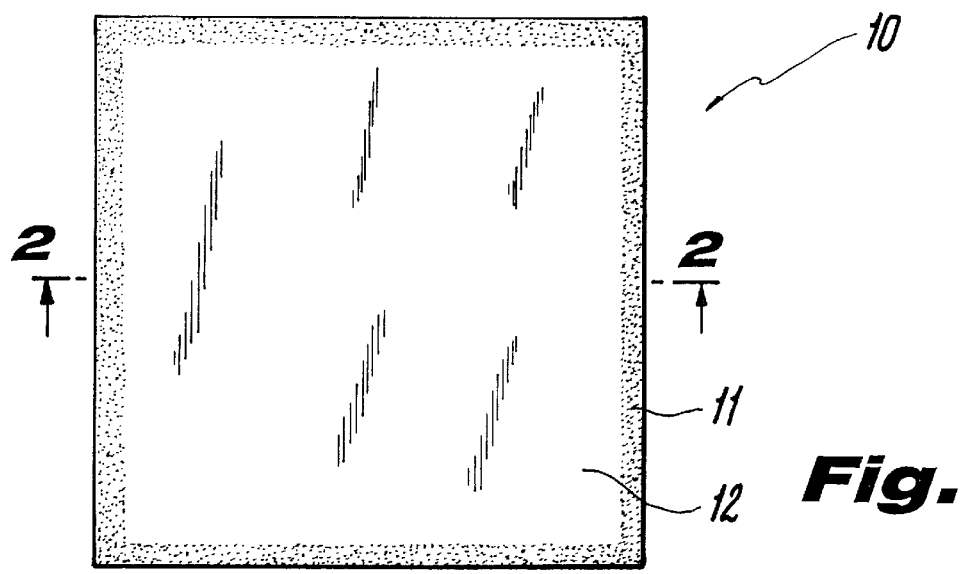
FIG. 1 is a side perspective elevational view of a representative filter sheet embodiment of the present invention.

It has been determined that edge-sealed filter sheets have a significantly longer useful life when used to filter suspensions containing organic matter, than non-edge-sealed filter sheets. While not wishing to be bound by theory, it is believed that the increased useful life results from the sealing edge closing off the edge zone of the filter sheet to filtrate permeation. It is hypothesized that at the edge zone of a non-sealed filter, sheet stagnation of the filtrate occurs. The stagnant zone apparently provides a far more hospitable area for microbial growth than filter sheet surfaces exposed to dynamic flow and allows a route of entry for microcobes external to the press. It is believed that by sealing the edge, sanitizing washes applied to the filter more efficiently sanitize the wetted portion of the filter sheet. It is hypothesized that when the exterior of the filter sheet remains wet and stagnate, it is never properly sanitized with the about 85° C. water routinely used on the interior of the sheet.

Recognizing the drawbacks of filter sheet edge seals of the prior art, the present invention discloses a more efficient and economical manner in which to effectively seal the edge of a filter sheet such that the sheet becomes liquid-tight at the sealed edges. The edge seal disclosed in the present invention resists adhesion of the seal to the filter plates, has good compressibility between the plates, withstands standard sanitization temperatures, and does not require prolonged curing prior to application or multi-layer applications to form a liquid-tight seal. After investigating numerous waxes which were found to be unacceptable as filter sheet edge seals, owing either to ineffective sealing of the edge, sticking to the plates, friability upon compression between the plates, and/or failure upon one or more exposures to hot sanitizing filter rinses, it has been discovered that certain waxes having defined physical characteristics provide a liquid-tight seal without the drawbacks of prior art filter sheet edge seals when applied to the edge of a filter sheet.

Presently preferred waxes useful in the present invention, include waxes having a melt point of about 130° C. to about 160° C., a hardness of about 80 to about 90 Shore A at about 85° C., and a viscosity of less than 20 cP at about 155° C. Non-petroleum derived waxes are preferred. Further, of the waxes useful with the present invention, the ethylene bis stearamide class of waxes is presently particularly preferred. These waxes have a melt point of about 144° C., but have a viscosity of about 11 cP at about 155° C. The durometer reading of these waxes is about 93 Shore A hardness both at about 25° C. and at about 85° C.

The presently preferred method of applying the wax to the edges of the filter sheet is by melting the wax and immersing the edge of the sheet into the melted wax.

Preferably the wax is applied quickly to the sheet to form a thin coating on the surface of the sheet, then the sheet having the surface wax is re-heated to remelt the wax and wick it into the sheet. Such technique reduces wax loading. Preferably the wax is permitted to contact the sheet for just a short period of time, about 15 seconds above the melt point of the wax, the wicking process from the applied surface wax into the sheet being completed at a temperature of about 150° C. for about 3 minutes in a forced-air oven, thereby forming a liquid-tight seal. Other methods of applying the wax to the sheet may be suitable as long as the liquid wax has sufficient contact time to fully impregnate the filter media. Such method should avoid oxidizing the wax and sheet. Wax build-up on the surface is undesirable as it both interferes with sealing of the press and interferes with thorough permeation of the wax into the filter sheet. Reduced wax loading using such wicking methodolgy was found to achieve higher compression failure.

The desirable properties of the wax relate, in part, to its melt point. Below melt point, the wax must be soft enough at ambient temperature to permit the press to seal, preferably a penetration reading (ASTM D1321) of at least about 2 decimillimeters/5 sec at ambient temperature, but advantageously below about 6 dmm/5 sec at 60° C. Hardness should be maintained under the conditions of temperature and edge seal pressure (which typically approaches about 4100 psi in the filter press) so that the wax does not drip or extrude out of the sheet and contact the surface of the filter press plates. The wax seal should be able to withstand exposure to temperatures at least as high as about 85° C., a temperature to which filter sanitizing fluids are not infrequently heated, for at least about 30 to about 45 minutes while the filter sheet is subjected to a sealing edge press of about 4100 psi. If hardness is not maintained at sanitizing temperatures, and under edge seal pressure, the wax may drip or extrude out of the sheet and upon cooling stick to the sealing surface of the filter press, requiring lengthy clean up.

During the process leading to the present invention, paraffin, semi-microcrystalline and microcrystalline waxes, that is, waxes derived from petroleum, were tested. These waxes were found to be inadequate for purposes of sealing filter sheets.

Petroleum-derived waxes were found to be excessively soft at about 85° C. and to stick unacceptably to the press. Polyethylene waxes likewise were also found to stick unacceptably to the press, and many were found to be unacceptably excessively soft at about 85° C. Even polyethylene waxes with a sufficiently high melt point to prevent excessive flow at about 85° C. were found to be inadequate in that they were too hard at ambient temperature such that the filter press would not properly seal. For example, Petrolite Polywax® 850, a polyethylene wax, having a melt point of about 107° C., and a durometer reading of about 95 at about 25° C. and about 50 at about 85° C. was found both to stick to the press and to inhibit proper sealing of the filter press. An additional problem noted with high melt point (> about 110° C.) polyethylene waxes was that the viscosity of such waxes at temperatures above their melt point was such that it was necessary to impregnate the media with melted wax at about 200° C. to achieve acceptable saturation of the media. Since polyethylene waxes heated to such temperatures may begin to oxidize, such procedure was found to be unacceptable. The most promising polyethylene wax uncovered was a mixture of Petrolite® 850 and Petrolite® 2000, two polyethylene waxes of different molecular weight. However, wax made from this mixture did not to seal with cold water and only sealed with hot water when the edge seal pressure reached 4100 psi, the hot fluid likely allowing some softening and better sealing. Further, even this mixture left some residue when the press was opened.

It is preferred that the wax seal be placed such that the treated portion of the filter sheet forms a border sufficient to allow the press sealing edge to completely contact the sheet on the wax-treated border. As would be understood by one of ordinary skill in the art, the wax seal need not extend all the way to the edge of the filter sheet, it being generally adequate for the wax seal to be circumfuse about the area through which the fluid to be filtered is to pass. Preferably, the wax border should extend inside the pressure seal, and more preferably both inside and outside the pressure seal.

The presently preferred ethylene bis stearamide ("EBS") wax should, presently preferably, be applied such as to achieve a complete cold water seal when the edge seal is at about 4100 psi. Presently preferably, at least an acceptable state of sealing with cold water should be reached at 3500 psi. Presently preferably the sheet should release from the press without leaving a residue and should not stick to the press when the press is opened. EBS wax was found to saturate and seal the edge of a filter sheet making the treated portion impermeable to flow. In studies of the useful life of filter sheet in the filtration of fluids containing organic materials, it was found that filter sheets having an edge seal of EBS had approximately twice the useful life as untreated filter sheets.

Referring now to the drawings, wherein like reference numerals identify similar structural elements of the subject invention, and which set forth representative embodiments of the present invention, additional advantages of the present invention become readily apparent.

Referring to FIG. 1, there is shown a side perspective view of a representative filter sheet, generally designated by the numeral 10, of the present invention. As illustrated, filter sheet 10 is sealed along its edges, extending to its periphery, with a wax edge seal 11. Wax edge seal 11 surrounds a non-waxed sealed portion 12 of filter sheet 10.

Figure 2:
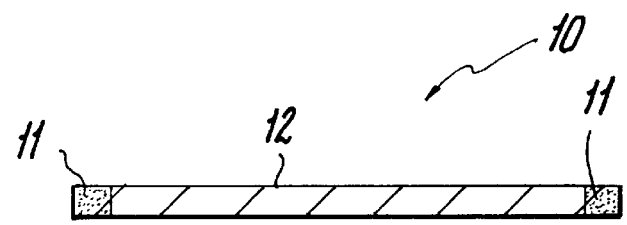
FIG. 2 is a side elevational cross-sectional view of the representative filter sheet embodiment of FIG. 1 cut along the 2–2' line.

Now referring to FIG. 2, there is shown a cross-sectional view of the representative filter sheet embodiment of FIG. 1 taken along the 2—2 line. Wax edge seal 11 extends throughout the width of the filter sheet 10 along its edge to the periphery of filter sheet 10, and extends from the filter sheet 10 upper surface to the filter sheet lower surface. Wax edge seal 11 surrounds a non-waxed sealed portion 12 of filter sheet 10.

Figure 3:
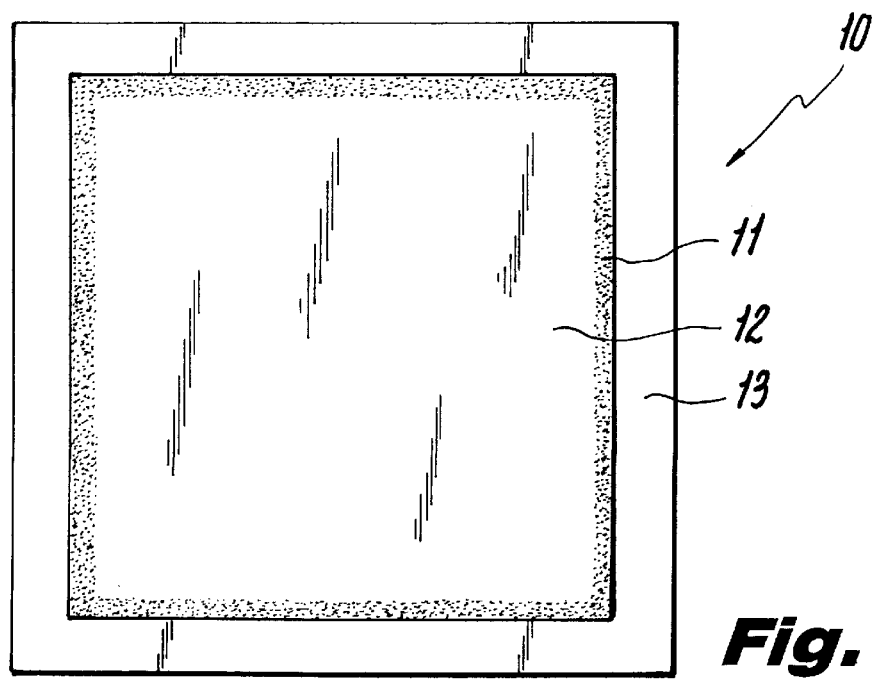
FIG. 3 is a side perspective view of a representative alternative embodiment of a filter sheet of the present invention.

Now referring to FIG. 3, there is shown side perspective view of an alternative filter sheet 10' embodiment of the present invention. Filter sheet 10' in this instance houses wax edge seal 11, such seal not extending to the periphery of filter sheet 10'. Rather wax edge seal 11 forms a circumfuse seal surrounding non-waxed sealed portion 12 of filter sheet 10' such as to form a non-sealed edge portion 13 in filter sheet 10'.

Figure 4:
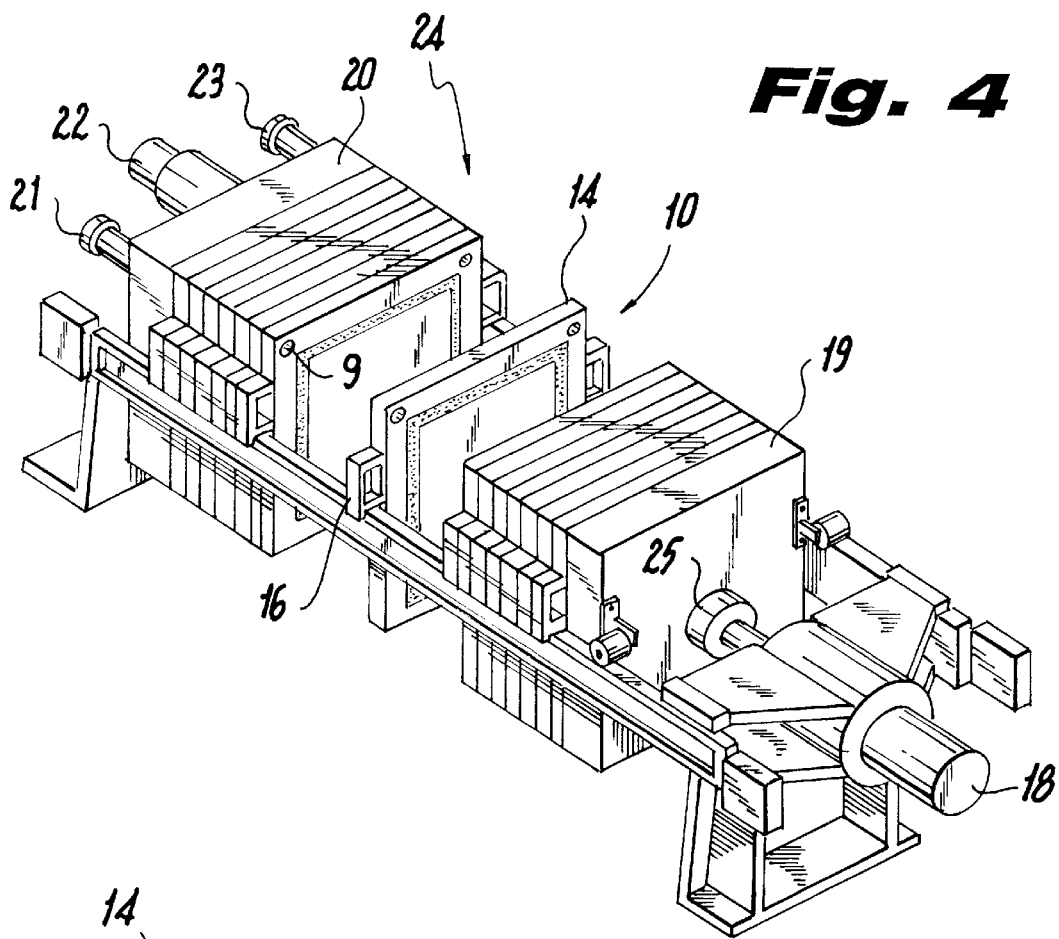
FIG. 4 is a side elevational view of a conventional prior art filter press in which the filter sheets of the present invention may be employed.

Now referring to FIG. 4, there is shown a perspective view of a conventional filter press, generally designated as numeral 24, in which the filter sheets of the present invention may be employed. Filter sheet 10 is placed between two plates 14 in filter press 24. Plates 14 are housed between stationary head 20 and movable head 19. Movable head 19 moves in response to movement of plunger 25 which moves in response to hydraulic fluid pressure supplied through hydraulic high pressure inlet 18. Movement of movable head 24 causes plates 14 to contact one another, preferably with enough pressure to prevent leakage between the plates. Fluid to be filtered is feed into filter press 24 through feed inlet 23. Filtrate leaving filter press 24 is discharged through filtrate discharge port 21. Filter press 24 may include a motor drive 22 for shifting plates 14. Although not shown, a basic filter press may also consist of an alternating combination of plates and cake-holding frames. As is known in the art, plate and frame shape may vary, with circular shapes not being infrequent.

Figure 5:
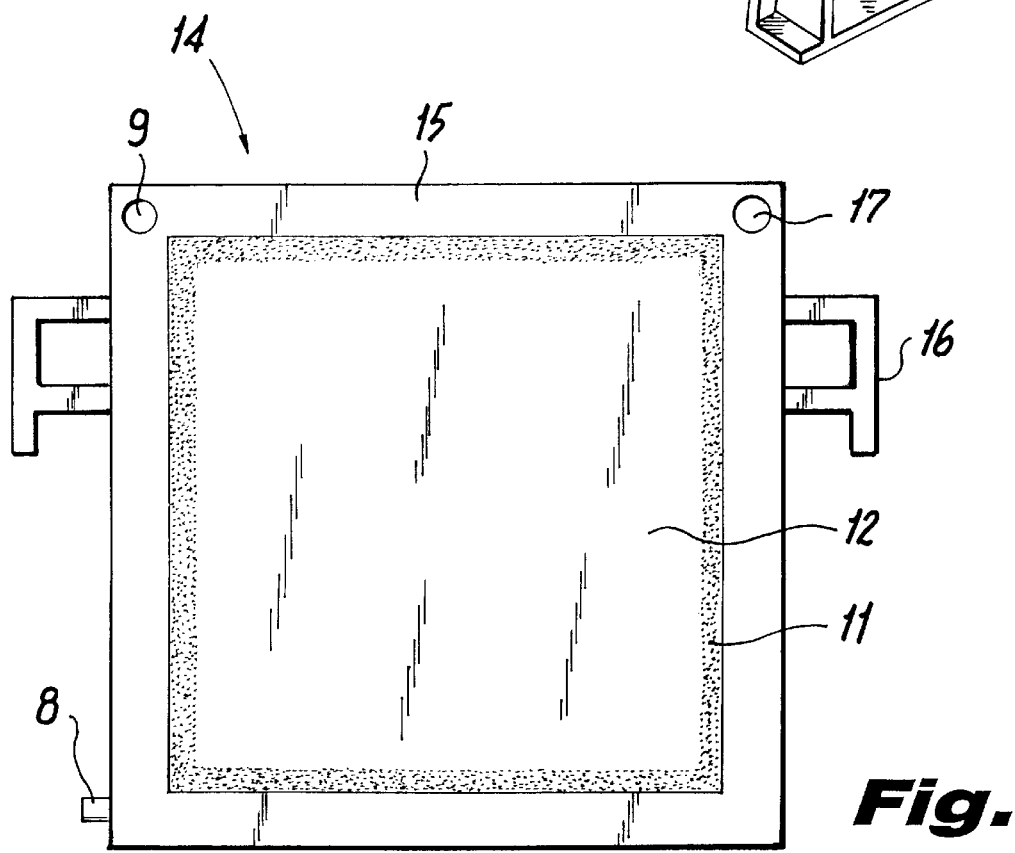
FIG. 5 is a perspective view of a filter press frame of the filter press of FIG. 4 with a filter sheet of the present invention thereon.

Turning now to FIG. 5, there is shown perspective view of a filter press plate 14 of filter press 24 of FIG. 4 with a filter sheet 10 of the present invention thereon. As illustrated, wax edge seal 11 of filter sheet 10 is preferably placed on filter press plate 14 such that wax edge seal 11 contacts filter press plate 14 along its solid framework 15, and is more preferably placed such that the most, if not all, of wax edge seal 11 contacts filter press plate 14 along its solid framework 15. Fluid to be filtered through non-waxed sealed portion 12 of filter sheet 10 enters through feed inlet 17. Filter press plate 14 may comprise one or more support elements 16 which may serve both to support filter press plate 14 on a portion of filter press 24 and as a handle to hold the plate during installation and removal.

While the invention has been described with respect to preferred embodiments, those skilled in the art will readily appreciate that various changes and/or modifications can be made to the invention without departing from the spirit or scope of the invention as defined by the appended claims.

What is claimed is:

1. A filter sheet positioned between plates of a filter press, said filter sheet having a fluid impermeable wax layer coursing about its perimeter, the wax of said impermeable wax layer having a durometer reading of about 75 to about 100 Shore A hardness at both about 25° C. and about 85° C., a melt point of about 110° C. to about 180° C., and a viscosity of less than 100 cP at about 155° C.

2. The filter sheet of claim 1 wherein said wax of said impermeable wax layer has a viscosity of less than about 40 cP.

3. The filter sheet of claim 1 wherein said wax of said impermeable wax layer has a viscosity of less than about 20 cP.

4. The filter sheet of claim 1 wherein said wax of said impermeable wax layer has a melt point of about 130° C. to about 160° C.

5. The filter sheet of claim 1 wherein said wax of said impermeable wax layer has a hardness of about 85 to about 95 shore A at about 25° C. and about 85°.

6. The filter sheet of claim 1 wherein said wax of said impermeable wax layer has a melt point of about 130° C. to about 160° C., a hardness of about 85 to about 95 Shore A at about 85° C., and a viscosity of less than about 20 cP at about 155° C.

7. The filter sheet of claim 1 wherein said impermeable wax layer substantially contacts about its perimeter a solid framework of the filter press plates between which it is positioned.

8. A filter sheet positioned between plates of a filter press, said filter sheet having sealant disposed about the periphery of the filter sheet, and surrounding an unsealed portion of the filter sheet, wherein the sealant comprises a wax layer comprised of a wax having a durometer reading of about 75 to about 100 Shore A hardness at both about 25° C. and about 85° C., a melt point of about 110° C. to about 180° C., and a viscosity of less than 100 cP at about 155° C.

9. The filter sheet of claim 8 wherein said wax of said wax layer has a durometer reading of about 85 to about 95 Shore A hardness at about 25° C. and about 85°.

10. The filter sheet of claim 8 wherein said wax of said wax layer has a melt point of about 130° C. to about 160° C.

11. The filter sheet of claim 8 wherein said wax of said wax layer has a viscosity of less than about 40 cP at about 155° C.

12. The filter sheet of claim 8 wherein said wax of said wax layer has a viscosity of less than about 20 cP at about 155° C.

13. The filter sheet of claim 8 wherein said impermeable wax layer substantially contacts about its perimeter a solid framework of the filter press plates between which it is positioned.

14. A filter sheet positioned between plates of a filter press, said filter sheet having a fluid impermeable wax layer coursing about an enclosed area of the filter sheet which is permeable to the fluid to be filtered, wherein the wax layer has a durometer reading of about 75 to about 100 Shore A hardness at both about 25° C. and about 85° C., a melt point of about 110° C. to about 180° C., and a viscosity of less than 100 cP at about 155° C.

15. The filter sheet of claim 14 wherein said wax of said impermeable wax layer has a durometer reading of about 85 to about 95 Shore A hardness at about 25° C. and about 85° C.

16. The filter sheet of claim 14 wherein said wax of said fluid impermeable wax layer has a melt point of about 130° C. to about 160° C.

17. The filter sheet of claim 14 wherein said wax of said fluid impermeable wax layer has a viscosity less than about 40 cP at about 155° C.

18. The filter sheet of claim 14 wherein said wax of said fluid impermeable wax layer has a viscosity less than about 20 cP at about, 155° C.

19. The filter sheet of claim 14 wherein said impermeable wax layer substantially contacts about its perimeter a solid framework of the filter press plates between which it is positioned.

20. A filter sheet positioned between a plates of a filter press, said filter sheet having a fluid impermeable ethylene bis stearamide wax layer coursing about an enclosed area of the filter sheet, such enclosed area being permeable to to liquid filtration.

21. The filter sheet of claim 20 wherein said impermeable wax layer substantially contacts about its perimeter a solid framework of the filter press plates between which it is positioned.

22. A filter sheet positioned between plates of a filter press, said filter sheet having a sealing means disposed around the periphery of the filter, and surrounding an unsealed portion of the filter sheet, wherein the sealing means comprises a wax layer comprising ethylene bis stearamide.

23. The filter sheet of claim 22 wherein said impermeable wax layer substantially contacts about its perimeter a solid framework of the filter press plates between which it is positioned.

24. A filter sheet positioned between plates of a filter press, said filter sheet having a fluid impermeable wax layer coursing about its perimeter, the wax of said impermeable wax layer comprising ethylene bis stearamide.

25. The filter sheet of claim 24 wherein said impermeable wax layer substantially contacts about its perimeter a solid framework of the filter press plates between which it is positioned.

* * * * *